(12) United States Patent
Morita

(10) Patent No.: US 11,189,438 B2
(45) Date of Patent: Nov. 30, 2021

(54) ARC SUPPRESSION DEVICE, MOBILE BODY, AND POWER SUPPLY SYSTEM

(71) Applicant: SONY CORPORATION, Tokyo (JP)

(72) Inventor: Tadashi Morita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 22 days.

(21) Appl. No.: 16/493,474

(22) PCT Filed: Mar. 6, 2018

(86) PCT No.: PCT/JP2018/008627
§ 371 (c)(1),
(2) Date: Sep. 12, 2019

(87) PCT Pub. No.: WO2018/198538
PCT Pub. Date: Nov. 1, 2018

(65) Prior Publication Data
US 2020/0135414 A1 Apr. 30, 2020

(30) Foreign Application Priority Data
Apr. 26, 2017 (JP) .............................. JP2017-087542

(51) Int. Cl.
*H01H 9/54* (2006.01)
*H01H 33/59* (2006.01)
(Continued)

(52) U.S. Cl.
CPC .............. *H01H 9/54* (2013.01); *H01H 33/59* (2013.01); *H01H 47/00* (2013.01); *H01H 73/18* (2013.01);
(Continued)

(58) Field of Classification Search
CPC .......... H01H 9/54; H01H 33/59; H01H 47/00; H01H 73/18; H01H 85/46; H01R 13/703; H02H 3/087
(Continued)

(56) References Cited

U.S. PATENT DOCUMENTS 3,912,941 A * 10/1975 Passarella .............. H01H 9/547
361/2
4,658,320 A * 4/1987 Hongel .................. H01H 9/542
361/13

(Continued)

FOREIGN PATENT DOCUMENTS

CN 1170214 A 1/1998
CN 1578144 A 2/2005
(Continued)

OTHER PUBLICATIONS

International Search Report and Written Opinion of PCT Application No. PPCT/JP2018/008627, dated Jun. 5, 2018, 10 pages of ISRWO.

(Continued)

*Primary Examiner* — Thienvu V Tran
*Assistant Examiner* — Sreeya Sreevatsa
(74) *Attorney, Agent, or Firm* — Chip Law Group

(57) ABSTRACT

Provided is an arc suppression device including one or more current-limiting circuits provided in parallel with a circuit breaker that switches between feeding and shutoff of power from a power supply. The current-limiting circuit shuts off a current from the power supply when the power from the power supply is fed to a load through a circuit breaker. The current from the power supply is shut off when a voltage generated by a potential difference between contacts of the circuit breaker becomes a predetermined voltage or higher in a case where feeding of the power from the power supply to (Continued)

the load is shut off by the circuit breaker. The potential difference is generated upon shutoff.

8 Claims, 11 Drawing Sheets

(51) Int. Cl.
    *H01H 47/00* (2006.01)
    *H01H 73/18* (2006.01)
    *H01H 85/46* (2006.01)
    *H01R 13/703* (2006.01)
    *H02H 3/087* (2006.01)

(52) U.S. Cl.
    CPC ........... *H01H 85/46* (2013.01); *H01R 13/703* (2013.01); *H02H 3/087* (2013.01)

(58) Field of Classification Search
    USPC .......................................................... 361/2
    See application file for complete search history.

(56) References Cited

U.S. PATENT DOCUMENTS

| | | | |
|---|---|---|---|
| 4,686,393 A * | 8/1987 | McEwan | H03K 17/08144 307/31 |
| 5,703,743 A | 12/1997 | Lee | |
| 8,907,234 B2 * | 12/2014 | Azzola | H01H 89/00 200/5 R |
| 2005/0007715 A1 | 1/2005 | Mukai et al. | |
| 2014/0091059 A1 * | 4/2014 | Henke | H01H 33/121 218/8 |
| 2014/0126098 A1 * | 5/2014 | Sarrus | H01H 33/596 361/91.5 |
| 2017/0098931 A1 | 4/2017 | Gerdinand et al. | |

FOREIGN PATENT DOCUMENTS

| | | |
|---|---|---|
| CN | 106663557 A | 5/2017 |
| EP | 0810618 A1 | 12/1997 |
| EP | 3158571 A1 | 4/2017 |
| ES | 2202550 T3 | 4/2004 |
| JP | 2003-203721 A | 7/2003 |
| JP | 2014-522088 A | 8/2014 |
| JP | 2017-527067 A | 9/2017 |
| KR | 10-2005-0001478 A | 1/2005 |
| TW | I249287 B | 2/2006 |
| WO | 2011/034140 A1 | 3/2011 |
| WO | 2015/192924 A1 | 12/2015 |
| WO | 2016/194584 A1 | 12/2016 |
| WO | 2017/018147 A1 | 2/2017 |

OTHER PUBLICATIONS

Extended European Search Report of EP Application No. 18792043.4, dated Apr. 1, 2020, 11 pages.

* cited by examiner

[FIG. 1]
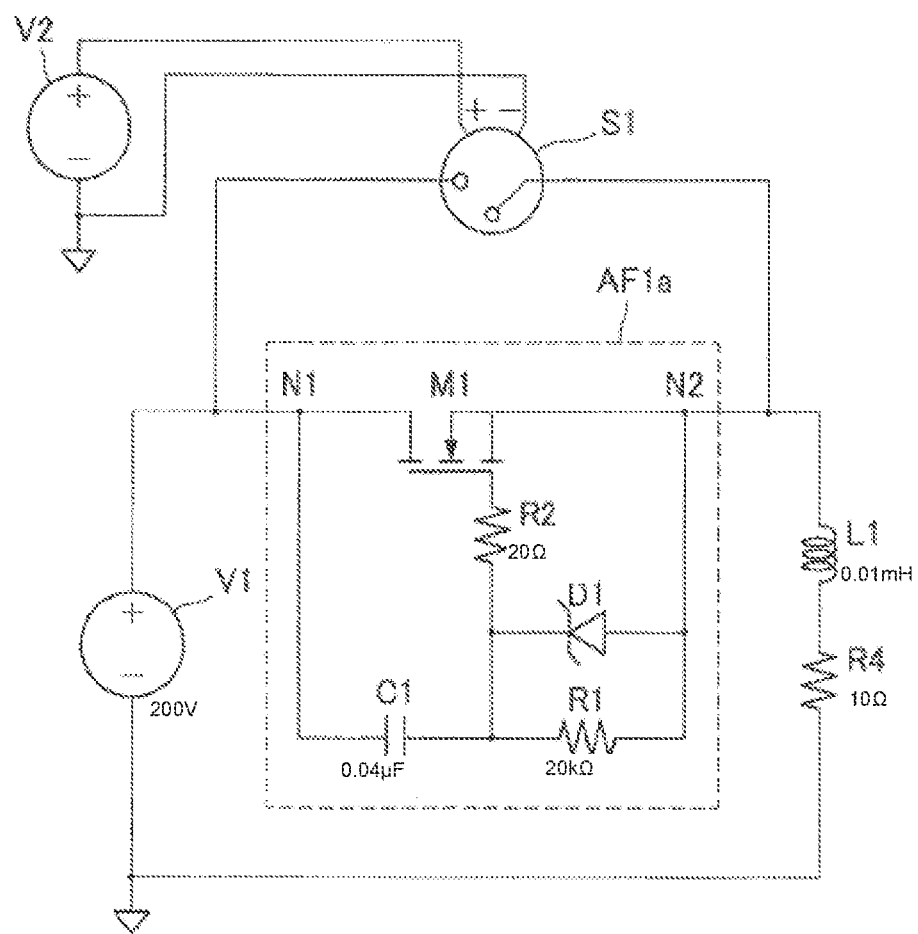

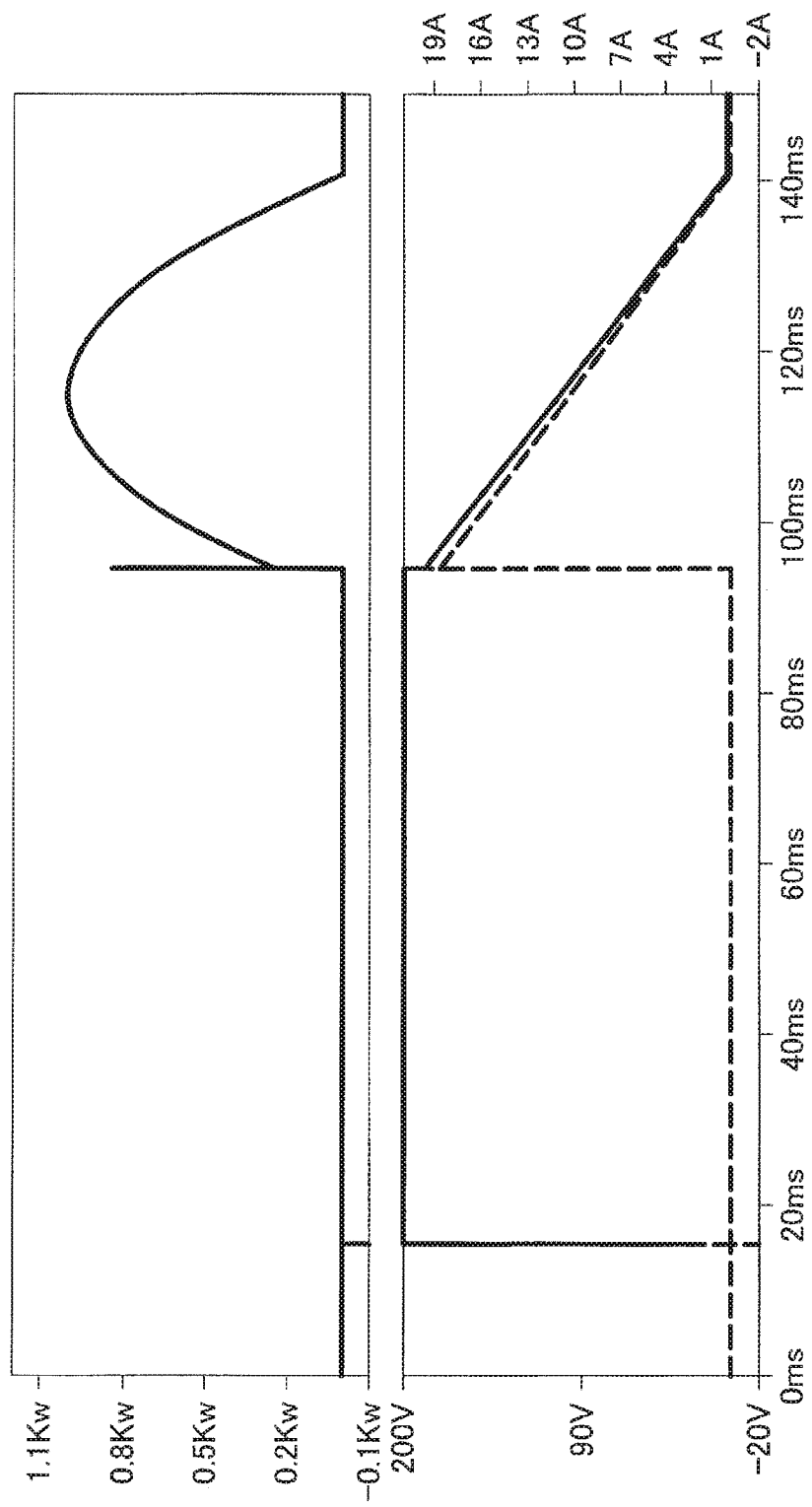
[FIG. 2]

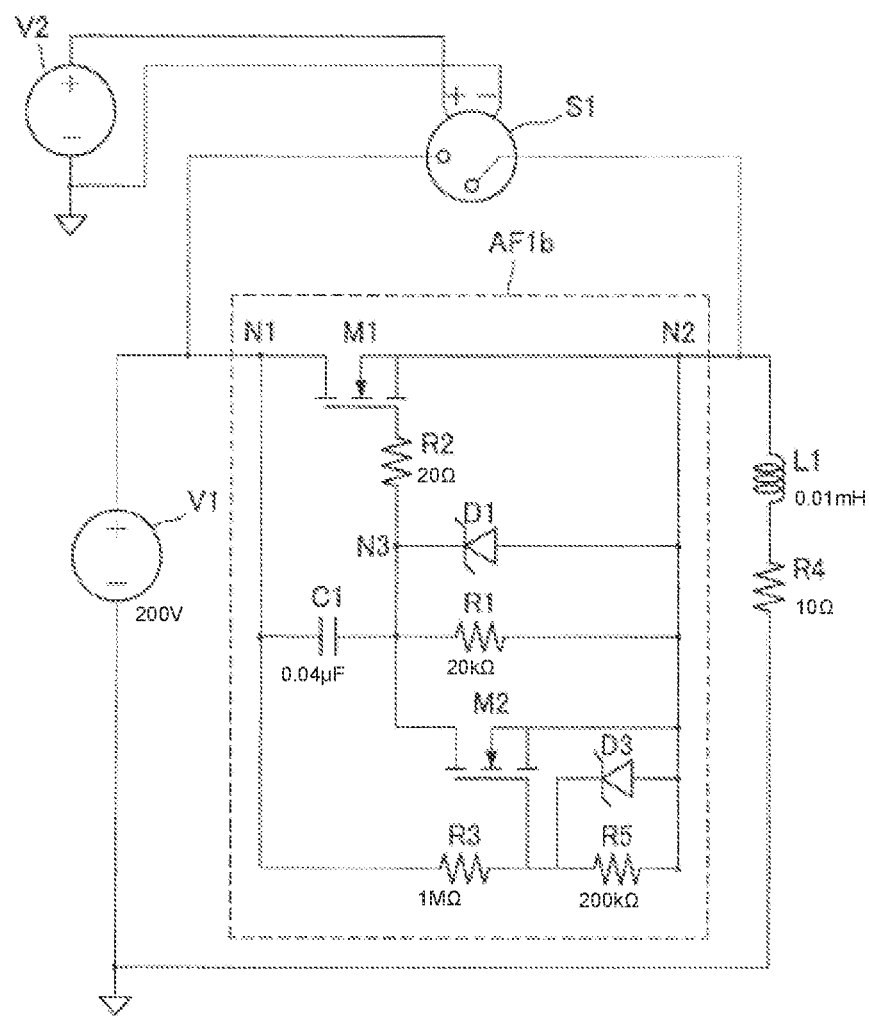
[FIG. 3]

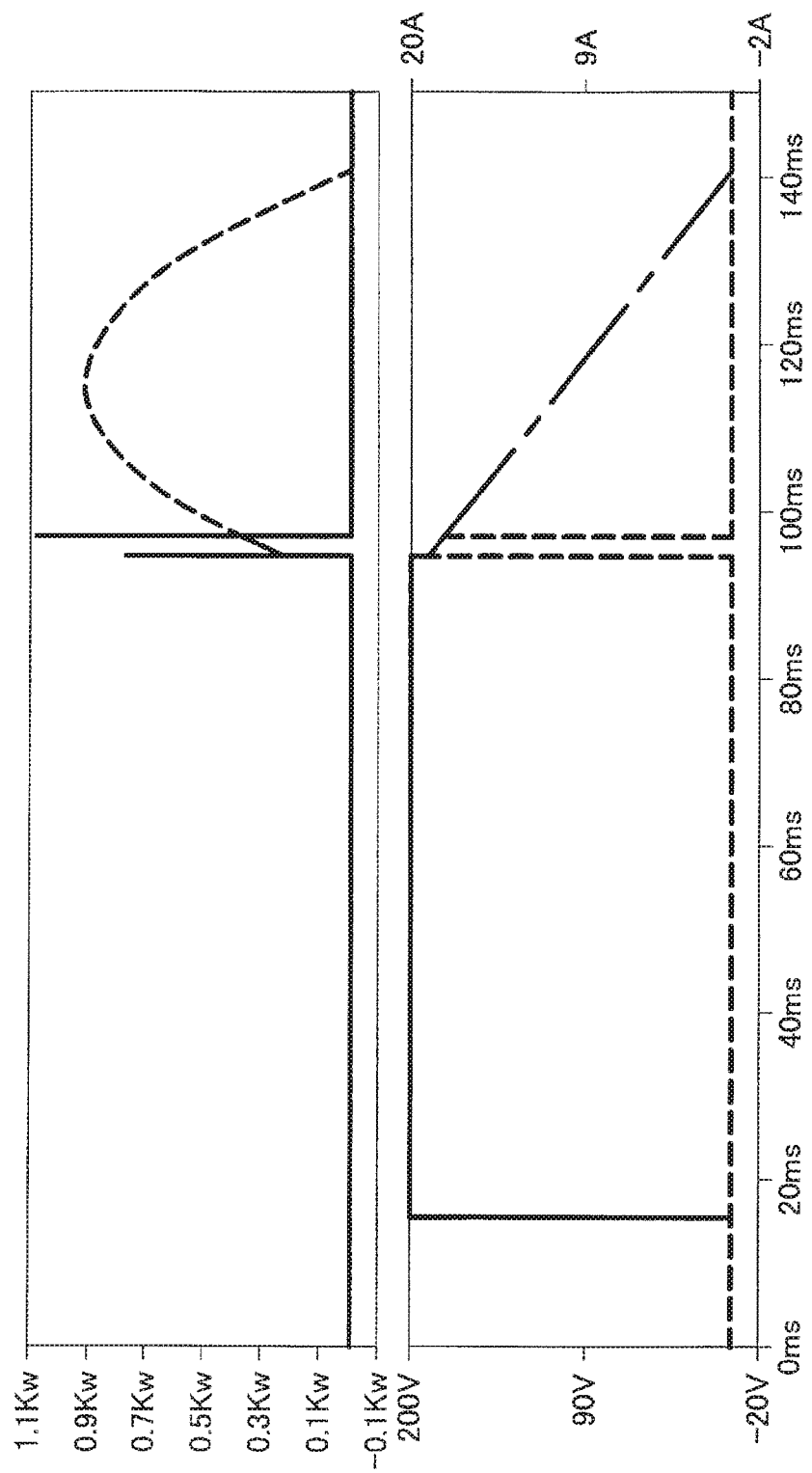
[FIG. 4]

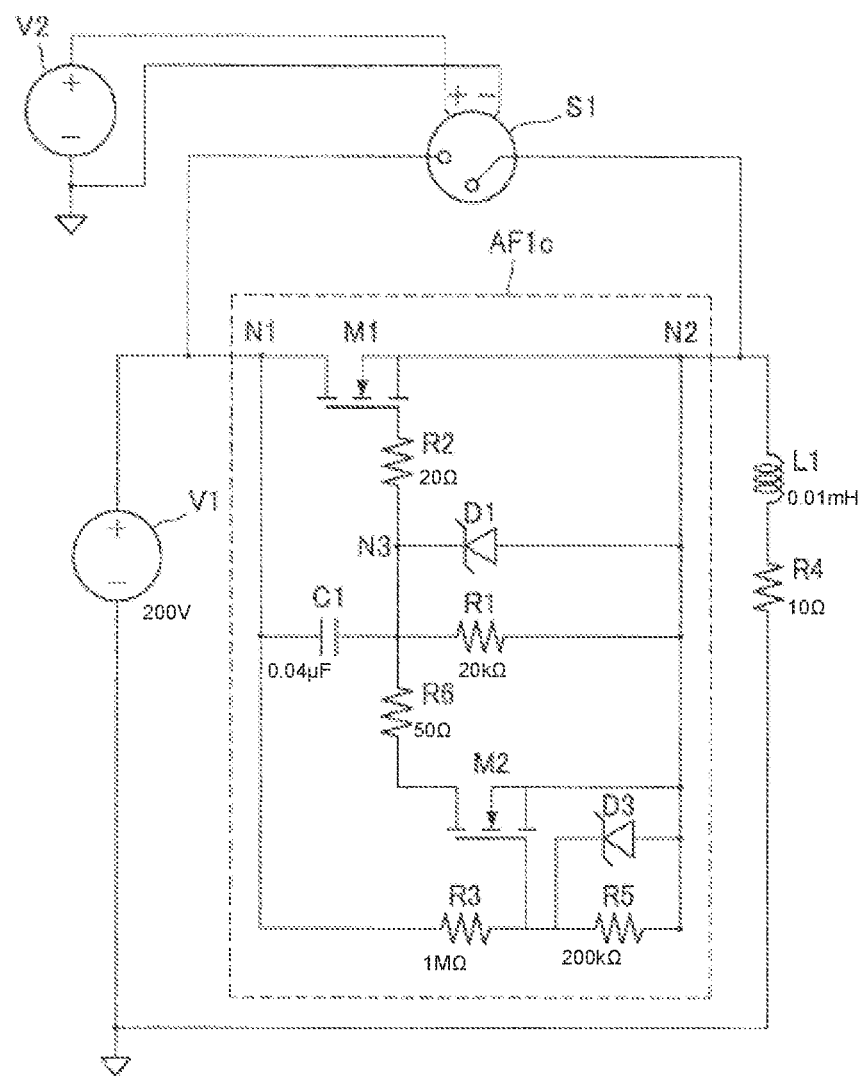
[FIG. 5]

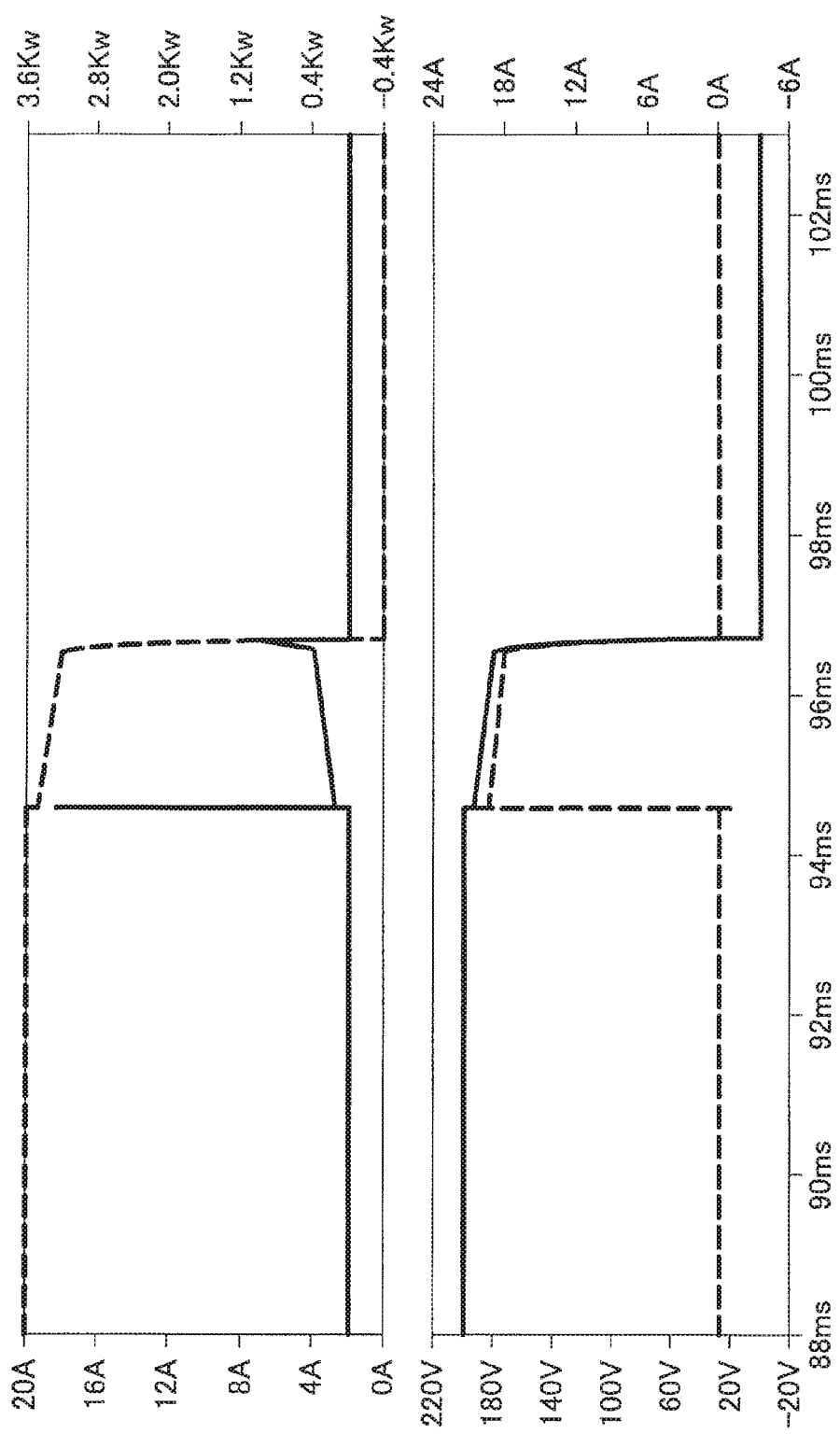
[FIG. 6]

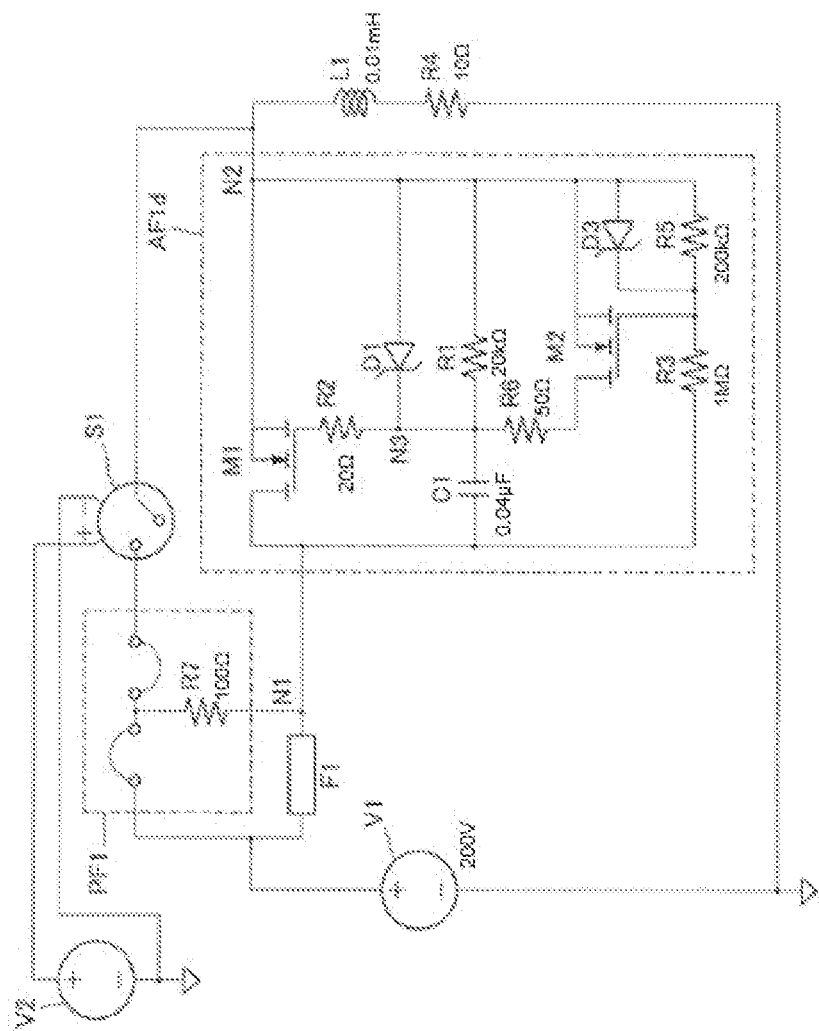
[FIG. 7]

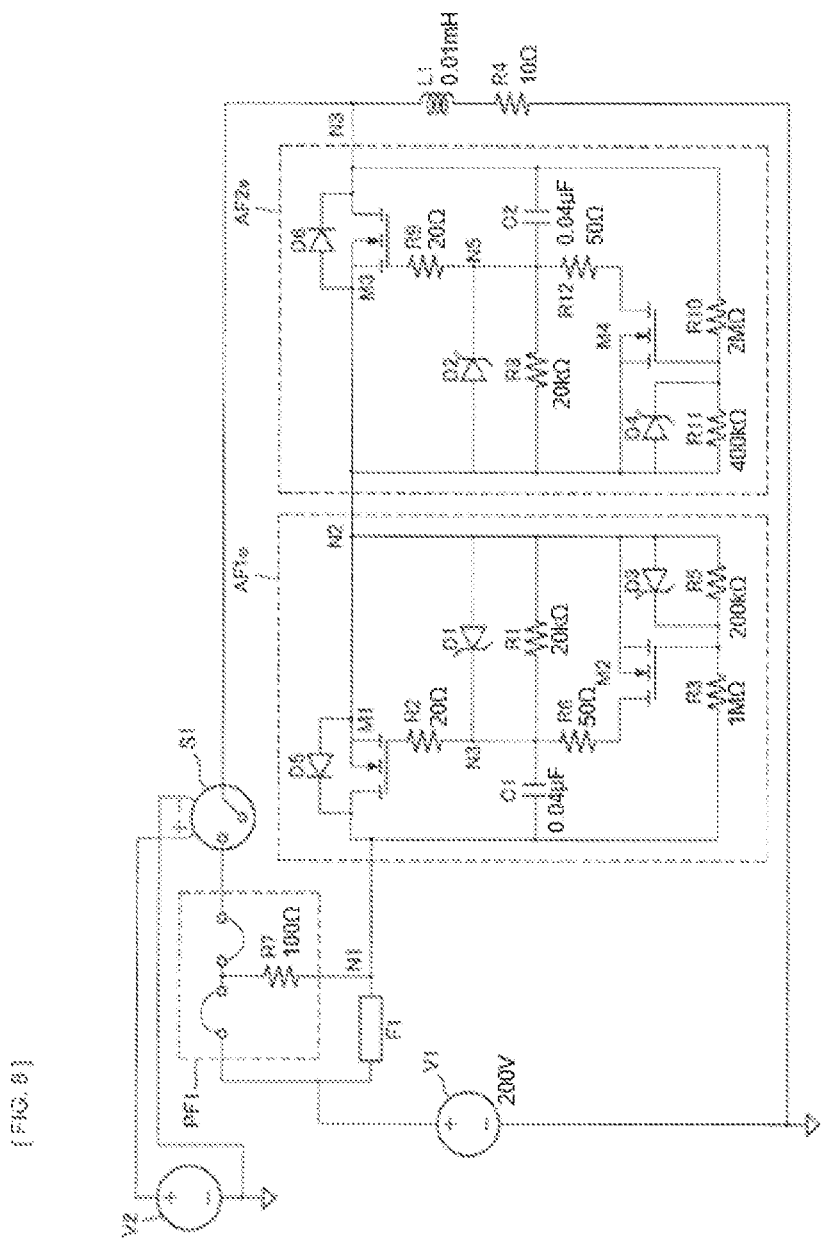
[FIG. 8]

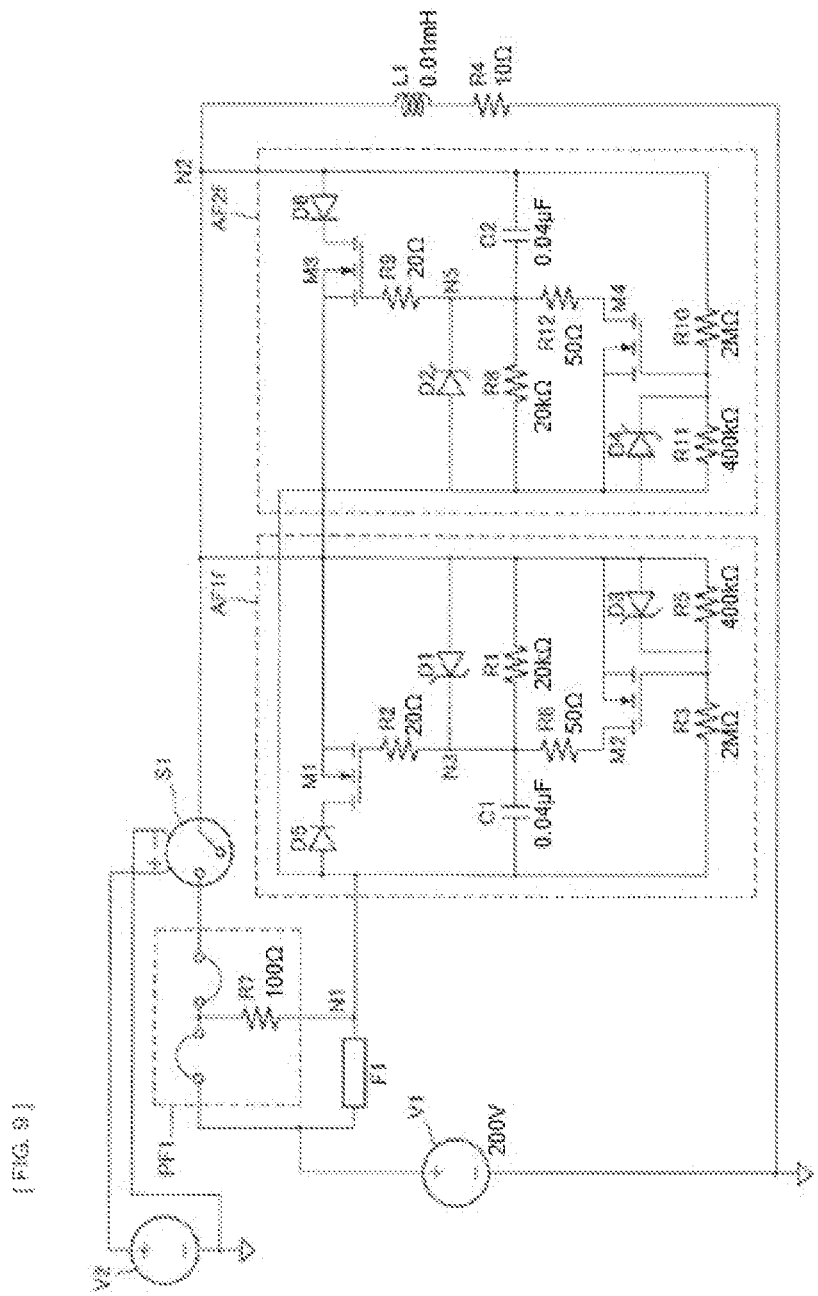
[FIG. 9]

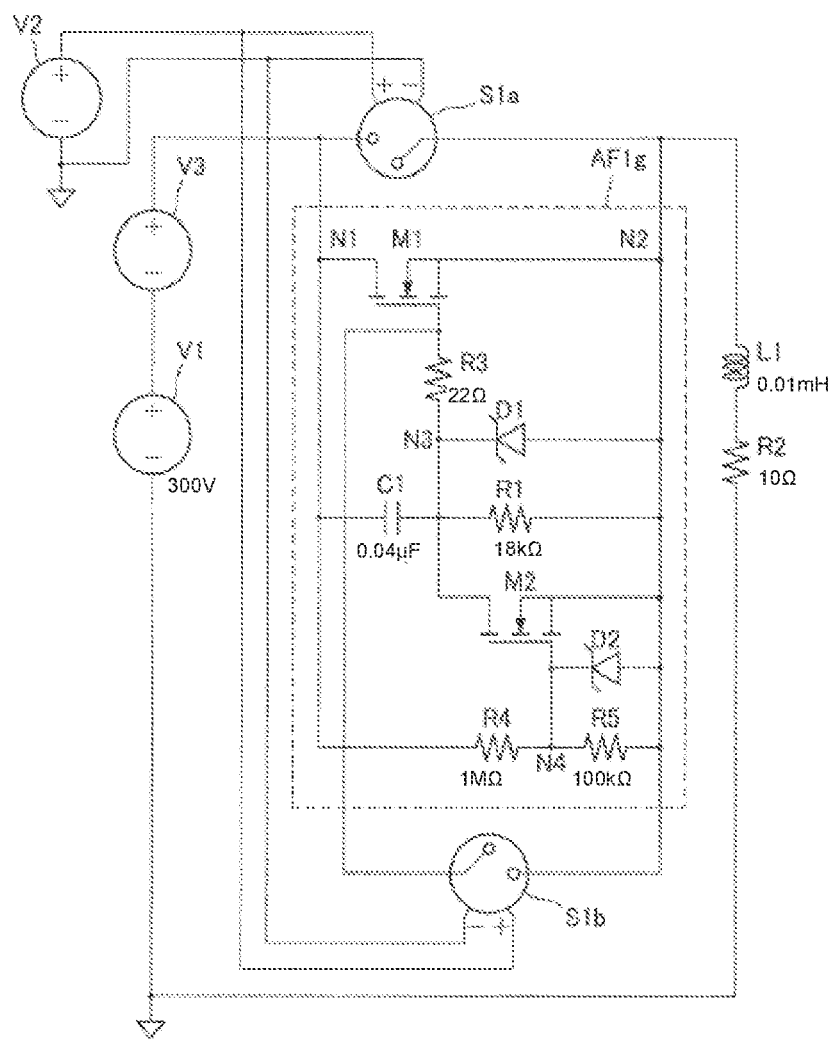
[FIG. 10]

[FIG. 11]
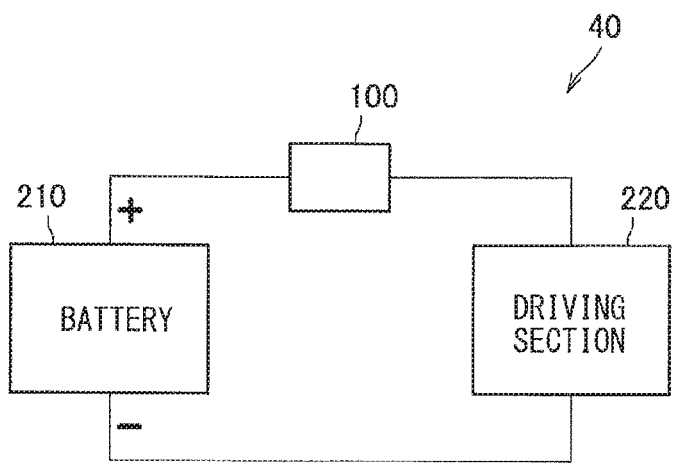

ARC SUPPRESSION DEVICE, MOBILE BODY, AND POWER SUPPLY SYSTEM

CROSS REFERENCE TO RELATED APPLICATIONS

This application is a U.S. National Phase of International Patent Application No. PCT/JP2018/008627 filed on Mar. 6, 2018, which claims priority benefit of Japanese Patent Application No. JP 2017-087542 filed in the Japan Patent Office on Apr. 26, 2017. Each of the above-referenced applications is hereby incorporated herein by reference in its entirety.

TECHNICAL FIELD

The present disclosure relates to an arc suppression device, a mobile body, and a power supply system.

BACKGROUND ART

In either case of direct-current power feeding or alternating-current power feeding, arc discharge occurs in the event of power disconnection. In a case of an alternate current, because there are moments when a voltage becomes zero every predetermined amount of time (for example, every ten milliseconds), the arc discharge stops by itself at least within the above-described predetermined amount of time (for example, within ten milliseconds). For the direct-current power feeding, however, because there is no moment of becoming zero voltage, the arc discharge does not stop by itself.

Accordingly, technologies are disclosed that intend to suppress occurrence of the arc discharge in the event of power disconnection in a case of the direct-current power feeding (see PTLs 1, 2, etc.)

CITATION LIST

Patent Literature

PTL 1: Japanese Unexamined Patent Application Publication No. 2003-203721 PTL 2: Japanese Unexamined Patent Application Publication (Published Japanese Translation of PCT Application) No. 2014-522088

SUMMARY OF THE INVENTION

Problems to be Solved by the Invention

As power to be shut off becomes greater, it is unavoidable to make a size larger for a current-limiting circuit that is used for suppression of an arc occurring at the time of power shutoff. Further, the shutoff consumes longer time, resulting in an increase in the power to be consumed by the current-limiting circuit during a period from starting to ending of the shutoff.

Therefore, the present disclosure proposes new and improved arc suppression device, mobile body, and power supply system that allow for reduction in power consumption in a semiconductor at a time of power shutoff by reducing power consumption of a current-limiting circuit that is used for suppression of an arc occurring at the time of power shutoff.

Means for Solving the Problems

According to the present disclosure, an arc suppression device is provided that includes one or more current-limiting circuits provided in parallel with a circuit breaker that switches between feeding and shutoff of power from a power supply. The current-limiting circuit shuts off a current from the power supply when the power from the power supply is fed to a load through a circuit breaker. The current from the power supply is shut off when a voltage generated by a potential difference between contacts of the circuit breaker becomes a predetermined voltage or higher in a case where feeding of the power from the power supply to the load is shut off by the circuit breaker. The potential difference is generated upon shutoff.

Further, according to the present disclosure, an arc suppression device is provided that includes one or more current-limiting circuits provided in parallel with a circuit breaker that switches between feeding and shutoff of power from a power supply. The current-limiting circuit includes a first switching element, a capacitor element, and a second switching element. The first switching element is turned off when the power from the power supply is fed to the load through a circuit breaker, and is turned on by a potential difference between contacts of the circuit breaker when feeding of alternate-current power from the power supply to the load is shut off by the circuit breaker, and is thereafter turned off after a current generated by the potential difference passes. The potential difference is generated upon shutoff. The capacitor element raises a gate voltage of the first switching element when feeding of the power from the power supply to the load is shut off. The second switching element is turned on in accordance with the potential difference to cause short-circuiting between a gate terminal of the first switching element and a source terminal of the first switching element.

Further, according to the present disclosure, a mobile body is provided that includes one or more arc suppression devices described above.

Further, according to the present disclosure, a power supply system is provided that includes a battery, a driving section, and one or more arc suppression devices according to claim 1. The battery feeds direct-current power. The driving section performs drive using the direct-current power fed from the battery. The one or more arc suppression devices are provided between the battery and the driving section.

Effects of the Invention

As described above, according to the present disclosure, it is possible to provide new and improved arc suppression device, mobile body, and power supply system that allow for reduction in power consumption in a semiconductor at a time of power shutoff by reducing power consumption of a current-limiting circuit that is used for suppression of an arc occurring at the time of power shutoff.

It is to be noted that the effects described above are not necessarily limitative, and any of effects described in the present disclosure, or any other effects that are comprehensible from the present specification may be provided along with the above-described effects or in lieu of the above-described effects.

BRIEF DESCRIPTION OF DRAWINGS

FIG. 1 is an explanatory diagram illustrating a configuration example of an arc suppression device according to an embodiment of the present disclosure.

FIG. 2 is an explanatory diagram illustrating variation in current, variation in voltage, and variation in power consumption amount.

FIG. 3 is an explanatory diagram illustrating a configuration example of the arc suppression device according to the embodiment.

FIG. 4 is an explanatory diagram illustrating variation in current, variation in voltage, and variation in power consumption amount.

FIG. 5 is an explanatory diagram illustrating a configuration example of the arc suppression device according to the embodiment.

FIG. 6 is an explanatory diagram illustrating variation in current, variation in voltage, and variation in power consumption amount.

FIG. 7 is an explanatory diagram illustrating a configuration example of the arc suppression device according to the embodiment.

FIG. 8 is an explanatory diagram illustrating a configuration example of the arc suppression device according to the embodiment.

FIG. 9 is an explanatory diagram illustrating a configuration example of the arc suppression device according to the embodiment.

FIG. 10 is an explanatory diagram illustrating a configuration example of the arc suppression device according to the embodiment.

FIG. 11 is an explanatory diagram illustrating a functional configuration example of a mobile body that includes an arc suppression device.

MODES FOR CARRYING OUT THE INVENTION

Hereinafter, preferred embodiments of the present disclosure will be described in detail with reference to the attached drawings. It is to be noted that, in the present specification and drawings, component parts having substantially the same functional configurations are denoted with the same reference numerals, and the duplicated descriptions are omitted.

It is to be noted that descriptions are given in the following order.
1. Embodiment of Present Disclosure
   1.1. First Configuration Example
   1.2. Second Configuration Example
   1.3. Third Configuration Example
   1.4. Fourth Configuration Example
   1.5. Fifth Configuration Example
   1.6. Sixth Configuration Example
   1.7. Seventh Configuration Example
2. Application Examples
3. Conclusion

1. EMBODIMENT OF PRESENT DISCLOSURE

1.1. First Configuration Example

First, a first configuration example of the embodiment of the present disclosure is described with reference to FIG. 1. FIG. 1 is an explanatory diagram illustrating a configuration example of an arc suppression device according to the embodiment of the present disclosure. FIG. 1 illustrates a configuration example of an arc suppression device intended to suppress occurrence of an arc at a time of power shutoff. The arc suppression device illustrated in FIG. 1 is configured to include a switch S1 that includes, for example, an SSR (Solid State Relay), and a current-limiting circuit AF1a.

The switch S1 is configured to be switched on/off by power from a direct-current power supply V2. In a case where the switch S1 is turned on, power from a power supply V1 that provides direct-current power is fed to a resistor R4. In a case where the switch S1 is turned off, feeding of the power from the power supply V1 to the resistor R4 is shut off.

The current-limiting circuit AF1a has an MOSFET (Metal-Oxide Semiconductor Field-Effect Transistor) M1, a Zener diode D1, resistors R1 and R2, and a capacitor C1. The current-limiting circuit AF1a is a circuit that suppresses occurrence of an arc in the switch S1 when a current is shut off by the switch S1 in a state where power is fed from the power supply V1.

A description is provided of each of elements that configure the current-limiting circuit AF1a. In the present embodiment, the MOSFET M1 uses an enhancement-mode NMOSFET. The MOSFET M1 is provided on a path through which a current from the power supply V1 flows. The capacitor C1 is provided between a drain terminal and a gate terminal of the MOSFET M1. Further, the resistor R1 is provided between the gate terminal and a source terminal of the MOSFET M1. The resistor R1 is provided to set, together with the capacitor C1, a time when a voltage is applied to the gate terminal of the MOSFET M1. Further, the capacitor C1 and the resistor R1 are coupled in series. The Zener diode D1 is provided to discharge electric charges stored in the capacitor C1 when contacts of the switch S1 are coupled to each other. In addition, the Zener diode D1 is provided to protect the gate terminal of the MOSFET M1.

Next, a description is provided on functions of the current-limiting circuit AF1a. When the switch S1 is put in an ON state, the MOSFET M1 is put in an OFF state. Therefore, no current flows through the current-limiting circuit AF1a.

When a current is shut off by the switch S1, a predetermined potential difference is generated between terminals of the switch S1. This potential difference corresponds to a voltage value of the power supply V1 at the time of shutoff. The potential difference that is generated between the terminals of the switch S1 induces a gate voltage of the MOSFET M1 through the capacitor C1 to turn on the MOSFET M1. When the MOSFET M1 is turned on, a current flows in a direction of lowering the potential difference between the terminals of the switch S1. In other words, when the MOSFET M1 turns on, the current flows in a direction from a node N1 to a node N2. In other words, when the terminals of the switch S1 are separated from each other, voltage integration with use of a voltage applied through the capacitor C1 and a current fixed by the resistor R1 is started.

When the MOSFET M1 is turned on, the current flows in the direction of lowering the potential difference between the terminals of the switch S1, thereby reducing the potential difference between the terminals of the switch S1. Therefore, when a current is shut off by the switch S1 in a state where power is fed from the power supply V1, even if arc occurrence conditions are satisfied, this results in no occurrence of an arc in the switch S1.

A voltage between the drain terminal and the source terminal of the MOSFET M1 falls within a voltage along a transfer mathematical function based on the gate voltage of the FET. As charging of the capacitor C1 is progressed by the potential difference that is generated between the terminals of the switch S1, the gate voltage of the MOSFET M1 lowers. With a decrease in the gate voltage of the MOSFET M1, the MOSFET M1 will make a transition to the OFF state in due course of time. Transition of the MOSFET M1 to the OFF state causes no current to flow through the MOSFET M1. The voltage integration in the current-limiting circuit AF1a ends with a state where the current stops flowing through the MOSFET M1.

FIG. 2 is an explanatory diagram illustrating, in a graphic manner, variation in a voltage at the node N2 of the current-limiting circuit AF1a, variation in a current flowing through the MOSFET M1, and variation in power consumption in the MOSFET M1 during feeding of power from the power supply V1 and shutoff of the power. The voltage at the node N2 of the current-limiting circuit AF1a is indicated with a solid line in a graph on the lower side of FIG. 2, variation in the current flowing through the MOSFET M1 is indicated with a dashed line in the graph on the lower side of FIG. 2, and variation in the power consumption in the MOSFET M1 is illustrated in a graph on the upper side of FIG. 2. Here, the description is given assuming that direct-current power of 200 V is fed from the power supply V1. It is assumed that the resistor R4 is 10Ω, an inductor L1 is 0.01 mH, the resistor R1 in the current-limiting circuit AF1a is 20 kΩ, the resistor R2 is 20Ω, and the capacitor C1 is 0.04 µF.

In an example illustrated in FIG. 2, the switch S1 is turned on at the time point of 15 milliseconds, and is turned off at the time point of 95 milliseconds. In this case, as illustrated in FIG. 2, when the direct-current power of 200 V from the power supply V1 is shut off by the switch S1, the voltage at the node N2 and the current flowing through the MOSFET M1 become zero at the time point of about 140 milliseconds. In other words, the current flows through the MOSFET M1 for about 45 milliseconds. The variation in the power consumption in the MOSFET M1 is indicated in the graph on the upper side of FIG. 2, and the amount of heat generation in the MOSFET M1 is obtained by integrating a range surrounded by an upward-convex curve line and a time scale within the range of 45 milliseconds from 95 milliseconds to about 140 milliseconds. In other words, in this example, when the direct-current power of 200 V from the power supply V1 is shut off by the switch S1, the amount of heat generation of about 40 J is generated in the MOSFET M1.

1.2. Second Configuration Example

As seen from the first configuration example, providing the current-limiting circuit AF1a in parallel with the switch S1 allows for suppression of occurrence of an arc at the time of power shutoff by the switch S1. In contrast, when a voltage of power to be shut off rises, a time consumed until a voltage applied to the MOSFET M1 or a current flowing through the MOSFET M1 becomes zero also gets longer in association with an increase in the power voltage. As illustrated in FIG. 2, the voltage applied to the MOSFET M1 or the current flowing through the MOSFET M1 decreases proportionately over time. Therefore, the voltage applied to the MOSFET M1 increases twofold, the time consumed until the voltage applied to the MOSFET M1 or the current flowing through the MOSFET M1 becomes zero increases twofold, and the amount of heat generation in the MOSFET M1 increases fourfold.

Therefore, a second configuration example describes a configuration that terminates the voltage integration in a current-limiting circuit when a voltage applied to the current-limiting circuit drops by a predetermined amount.

FIG. 3 is an explanatory diagram illustrating a configuration example of the arc suppression device according to the embodiment of the present disclosure. FIG. 3 illustrates a configuration example of the arc suppression device intended to suppress occurrence of an arc at the time of power shutoff. The arc suppression device illustrated in FIG. 3 is configured to include a switch S1 that includes, for example, the SSR, and a current-limiting circuit AF1b.

The switch S1 is configured to be switched on/off by power from the direct-current power supply V2. In a case where the switch S1 is turned on, power from the power supply V1 that provides direct-current power is fed to a resistor R4. In a case where the switch S1 is turned off, feeding of the power from the power supply V1 to the resistor R4 is shut off.

The current-limiting circuit AF1b has MOSFETs M1 and M2, Zener diodes D1 and D3, resistors R1, R2, R3, and R5, and a capacitor C1. The current-limiting circuit AF1b is a circuit that suppresses occurrence of an arc in the switch S1 when a current is shut off by the switch S1 in a state where power is provided from the power supply V1.

The current-limiting circuit AF1b illustrated in FIG. 3 further adds the MOSFET M2 that is the NMOSFET, the Zener diode D3, and the resistors R3 and R5 to the current-limiting circuit AF1a illustrated in FIG. 1.

When power to be fed from the power supply V1 is shut off by the switch S1, if the voltage integration by the current-limiting circuit AF1b is started, the resistors R3 and R5 divide a voltage that is generated between nodes N1 and N2. The MOSFET M2 is turned on when a gate-source voltage becomes a predetermined value. A turn-on state of the MOSFET M2 means that short-circuiting takes place between the gate and the source of the MOSFET M1. When the MOSFET M2 is turned on, and short-circuiting takes place between the gate and the source of the MOSFET M1, the MOSFET M1 is turned off to terminate the voltage integration by the current-limiting circuit AF1b. Further, the Zener diode D3 is provided to protect the MOSFET M2.

FIG. 4 is an explanatory diagram illustrating, in a graphic manner, variation in a voltage at the node N2 of the current-limiting circuit AF1b, variation in a current flowing through the MOSFET M1, and variation in power consumption in the MOSFET M1 upon feeding of power from the power supply V1 and shutoff of the power. The voltage at the node N2 of the current-limiting circuit AF1b is indicated with a solid line in a graph on the lower side of FIG. 4, variation in the current flowing through the MOSFET M1 is indicated with a dashed line in the graph on the lower side of FIG. 4, and variation in the power consumption in the MOSFET M1 is illustrated in a graph on the upper side of FIG. 4. Here, a description is given assuming that direct-current power of 200 V is fed from the power supply V1. It is assumed that the resistor R4 is 10Ω, an inductor L1 is 0.01 mH, the resistor R1 in the current-limiting circuit AF1b is 20 kΩ; the resistor R2 is 20Ω; the resistor R3 is 1 MΩ, the resistor R5 is 200 kΩ, and the capacitor C1 is 0.04 µF. Further, it is assumed that the MOSFET M2 is turned on when the gate-source voltage becomes 5 V.

In an example illustrated in FIG. 4, the switch S1 is turned on at the time point of 15 milliseconds, and is turned off at the time point of 95 milliseconds. In this case, as illustrated in FIG. 4, when the direct-current power of 200 V from the power supply V1 is shut off by the switch S1, the voltage integration with use of a voltage applied through the capacitor C1 and a current fixed by the resistor R1 starts. When the voltage integration starts, a voltage that is generated between the nodes N1 and N2 is divided by the resistors R3 and R5, and the MOSFET M2 is turned on when a voltage at both terminals of the resistor R5 reaches 5 V that is a voltage at which the MOSFET M2 is turned on. When the MOSFET M2 is turned on, short-circuiting takes place between the gate and the source of the MOSFET M1 to terminate the voltage integration.

After the switch S1 is shut off at the time point of 95 milliseconds, a current flows through the MOSFET M1 during a period of time when the voltage integration by the current-limiting circuit AF1b is performed. The variation in the power consumption in the MOSFET M1 is indicated in the graph on the upper side of FIG. 4, and the amount of heat generation in the MOSFET M1 is obtained by integrating a range including two peaks that is surrounded by an upward-convex solid line and a time scale within a quite short period of time from 95 milliseconds onward. In other words, the power consumption by the MOSFET M1 in the current-limiting circuit AF1b becomes about 2 J. In such a manner, by providing the MOSFET M2 and the resistors R3 and R5 that cause the MOSFET M2 to be turned on, it is possible to reduce the power consumption of the MOSFET M1 more greatly as compared with the current-limiting circuit AF1a. It is to be noted that a line from 95 milliseconds onward that is indicated with a dashed line in the graph on the upper side of FIG. 4 is illustrated in such a manner that the variation in the power consumption in the MOSFET M1 that is indicated in the graph on the upper side of FIG. 2 is overlapped thereon for comparison for a case where the MOSFET M2 fails to operate (in other words, for a case of being equivalent to the circuit in FIG. 1). Further, a line from 95 milliseconds onward that is indicated with a dashed-dotted line in the graph on the lower side of FIG. 4 is illustrated in such a manner that the variation in the current flowing through the MOSFET M1 that is indicated in the graph on the lower side of FIG. 2 is overlapped thereon for comparison for a case where the MOSFET M2 fails to operate (in other words, for a case of being equivalent to the circuit in FIG. 1).

Therefore, the current-limiting circuit AF1b according to the second configuration example of the embodiment of the present disclosure makes it possible to greatly reduce the amount of the power consumption of the MOSFET M1. Further, even if a voltage to be provided from the power supply V1 increases twofold, the amount of the power consumption of the MOSFET M1 is limited to two times as much as its original value. This allows the current-limiting circuit AF1b according to the second configuration example of the embodiment of the present disclosure to avoid an increase in the size of the MOSFET M1.

1.3. Third Configuration Example

Configuring a current-limiting circuit as in the second configuration example makes it possible to greatly reduce the amount of the power consumption of the MOSFET M1. Next, a description is provided of an example of an arc suppression device that adds a configuration of suppressing a surge that can take place when a coil component is included in a load.

FIG. 5 is an explanatory diagram illustrating a configuration example of the arc suppression device according to the embodiment of the present disclosure. FIG. 5 illustrates a configuration example of the arc suppression device intended to suppress occurrence of an arc at the time of power shutoff. The arc suppression device illustrated in FIG. 5 is configured to include a switch S1 that includes, for example, the SSR, and a current-limiting circuit AF1c.

The switch S1 is configured to be switched on/off by power from the direct-current power supply V2. In a case where the switch S1 is turned on, power from the power supply V1 that provides direct-current power is fed to a resistor R4. In a case where the switch S1 is turned off, feeding of the power from the power supply V1 to the resistor R4 is shut off.

The current-limiting circuit AF1c has MOSFETs M1 and M2, Zener diodes D1 and D3, resistors R1, R2, R3, R5, and R6, and a capacitor C1. The current-limiting circuit AF1c is a circuit that suppresses occurrence of an arc in the switch S1 when a current is shut off by the switch S1 in a state where power is fed from the power supply V1.

The current-limiting circuit AF1c has a configuration in which the resistor R6 is additionally provided, as compared with the current-limiting circuit AF1b. When direct-current power from the power supply V1 is shut off by the switch S1, if a voltage at both terminals of the resistor R5 reaches a voltage at which the MOSFET M2 is to be turned on and the MOSFET M2 is turned on, the resistor R6 is provided to perform integration at high speed by being coupled to the resistor R1 in parallel. In other words, in a configuration of the arc suppression device that is illustrated in FIG. 3, when the MOSFET M2 is turned on, the configuration is made in such a manner that there exists only the capacitor C1 between the power supply V1 and the resistor R4 serving as a load. However, in a configuration of the arc suppression device that is illustrated in FIG. 3, when the MOSFET M2 is turned on, the configuration is made in such a manner that there exist the capacitor C1 and the resistor R6 between the power supply V1 and the resistor R4 serving as the load. The configuration in which the capacitor C1 and the resistor R6 are present between the power supply V1 and the resistor R4 serving as the load allows the current-limiting circuit AF1c to reduce a leakage current even if the MOSFET M2 is turned on.

FIG. 6 is an explanatory diagram illustrating, in a graphic manner, variation in a voltage at the node N2 of the current-limiting circuit AF1c, variation in a current flowing through the MOSFET M1, and variation in power consumption in the MOSFET M1 upon feeding of power from the power supply V1 and shutoff of the power. The voltage at the node N2 of the current-limiting circuit AF1c is indicated with a solid line in a graph on the lower side of FIG. 6, variation in the current flowing through the MOSFET M1 is indicated with a dashed line in the graph on the lower side of FIG. 6, and variation in the power consumption in the MOSFET M1 is illustrated in a graph on the upper side of FIG. 6. Here, a description is given assuming that direct-current power of 200 V is fed from the power supply V1. It is assumed that the resistor R4 is 10Ω, an inductor L1 is 0.01 mH, the resistor R1 in the current-limiting circuit AF1b is 20 kΩ, the resistor R2 is 20Ω, the resistor R3 is 1 MΩ, the resistor R5 is 200 kΩ, the resistor R6 is 50Ω, and the capacitor C1 is 0.04 µF. Further, it is assumed that the MOSFET M2 is turned on when the gate-source voltage becomes 5 V.

As seen from FIG. 6, by providing the resistor R6, the current-limiting circuit AF1c reduces a surge component (a portion of second peak power in FIG. 4) that is present in the solid-line graph illustrating the variation in the power consumption in the MOSFET M1 in FIG. 4.

1.4. Fourth Configuration Example

Configuring a current-limiting circuit as in the third configuration example makes it possible to greatly reduce the amount of the power consumption of the MOSFET M1, and to suppress a surge component that can take place at the time of shutoff. Next, a description is provided of an example of an arc suppression device that is added with a configuration allowing power to be shut off safely in a case of failure of the MOSFET M1 (in a case of failing to function as a switch).

FIG. 7 is an exemplary diagram illustrating a configuration example of the arc suppression device according to the embodiment of the present disclosure. FIG. 7 illustrates a configuration example of the arc suppression device intended to suppress occurrence of an arc at the time of power shutoff. The arc suppression device illustrated in FIG. 7 is configured to include a switch S1 that includes, for example, the SSR, a current-limiting circuit AF1d, a fuse F1, and a protector PF1.

The switch S1 is configured to be switched on/off by power from the direct-current power supply V2. In a case where the switch S1 is turned on, power from the power supply V1 that provides direct-current power is fed to a resistor R4. In a case where the switch S1 is turned off, feeding of the power from the power supply V1 to the resistor R4 is shut off.

The current-limiting circuit AF1d has a configuration similar to that of the current-limiting circuit AF1c illustrated in FIG. 5. In other words, the current-limiting circuit AF1d has MOSFETs M1 and M2, Zener diodes D1 and D3, resistors R1, R2, R3, R5, and R6, and a capacitor C1. The current-limiting circuit AF1d is a circuit that suppresses occurrence of an arc in the switch S1 when a current is shut off by the switch S1 in a state where power is fed from the power supply V1.

The protector PF1 is provided to bypass a current flowing through the current-limiting circuit AF1d from the power supply V1 in the event of failure of the MOSFET M1 (that is, in a case where the MOSFET M1 fails to function as a switching element, and serves only as a simple resistor), and includes two fuses and a resistor R7 that is provided between the two fuses. In other words, the protector PF1 has three terminals. The resistor R7 has a role of forcing the fuses built in the protector PF1 to be fused. The fuse F1 is provided between the power supply V1 and the current-limiting circuit AF1d, as illustrated in FIG. 7.

Therefore, the arc suppression device illustrated in FIG. 7 allows power to be shut off safely in the case of failure of the MOSFET M1 (in a case of failing to function as a switch) by providing the fuse F1 and the protector PF1.

1.5. Fifth Configuration Example

As in the fourth configuration example, it is possible to shut off power safely even in the case of failure of the MOSFET M1. Next, a description is provided of an example of an arc suppression device that allows for suppression of an arc at the time of power shutoff while preventing an increase in the circuit scale also in a case where power is fed in both directions instead of a single direction.

FIG. 8 is an explanatory diagram illustrating a configuration example of the arc suppression device according to the embodiment of the present disclosure. FIG. 8 illustrates a configuration example of the arc suppression device intended to suppress occurrence of an arc at the time of power shutoff. The arc suppression device illustrated in FIG. 8 is configured to include a switch S1 that includes, for example, the SSR, current-limiting circuits AF1e and AF2e, a fuse F1, and a protector PF1.

The switch S1 is configured to be switched on/off by power from the direct-current power supply V2. In a case where the switch S1 is turned on, power from the power supply V1 that provides direct-current power is fed to a resistor R4. In a case where the switch S1 is turned off, feeding of the power from the power supply V1 to the resistor R4 is shut off.

The current-limiting circuit AF1e has MOSFETs M1 and M2, Zener diodes D1 and D3, a diode D5, resistors R1, R2, R3, R5, and R6, and a capacitor C1. The current-limiting circuit AF1e is a circuit that suppresses occurrence of an arc in the switch S1 when a current is shut off by the switch S1 in a state where power is provided from the side of a node N1.

The current-limiting circuit AF2e has a configuration in which the current-limiting circuit AF1e is inverted. In other words, the current-limiting circuit AF2e has MOSFETs M3 and M4, Zener diodes D2 and D4, a diode D6, resistors R8, R9, R10, R11, and R12, and a capacitor C2. The current-limiting circuit AF2e is a circuit that suppresses occurrence of an arc in the switch S1 when a current is shut off by the switch S1 in a state where power is fed from the side of a node N3.

If the switch S1 is turned off when a current flows from the node N1 side to the node N3 side, the current-limiting circuit AF1e has a function to gradually lower the current flowing from the node N1 side to the node N3 side. Therefore, the current-limiting circuit AF2e is provided with the diode D6 and thereby passes the current from the node N1 side to the node N3 side.

In contrast, if the switch S1 is turned off when a current flows from the node N3 side to the node N1 side, the current-limiting circuit AF2e has a function to gradually lower the current flowing from the node N3 side to the node N1 side. Therefore, the current-limiting circuit AF1e is provided with the diode D5 and thereby passes the current from the node N3 side to the node N1 side.

The arc suppression device illustrated in FIG. 8 allows for suppression of an arc at the time of power shutoff while preventing an increase in the circuit scale also in a case where power is provided in both directions instead of a single direction. As with the arc suppression device illustrated in FIG. 7, the arc suppression device illustrated in FIG. 8 is provided with the fuse F1 and the protector PF1; however, the arc suppression device illustrated in FIG. 8 may not be provided with the fuse F1 or the protector PF1.

1.6. Sixth Configuration Example

As in the fifth configuration example, it is possible to suppress an arc at the time of power shutoff while preventing an increase in the circuit scale also in a case where power is fed in both directions instead of a single direction. In the fifth configuration example, current-limiting circuits are coupled in series; however, the current-limiting circuits may be coupled in parallel.

FIG. 9 is an explanatory diagram illustrating a configuration example of the arc suppression device according to the embodiment of the present disclosure. FIG. 9 illustrates a configuration example of the arc suppression device intended to suppress occurrence of an arc at the time of power shutoff. The arc suppression device illustrated in FIG. 9 is configured to include a switch S1 that includes, for example, the SSR, current-limiting circuits AF1f and AF2f, a fuse F1, and a protector PF1.

The switch S1 is configured to be switched on/off by power from the direct-current power supply V2. In a case where the switch S1 is turned on, power from the power supply V1 that provides direct-current power is fed to a resistor R4. In a case where the switch S1 is turned off, feeding of the power from the power supply V1 to the resistor R4 is shut off.

The current-limiting circuit AF1$f$ has MOSFETs M1 and M2, Zener diodes D1 and D3, a diode D5, resistors R1, R2, R3, R5, and R6, and a capacitor C1. The current-limiting circuit AF1$f$ is a circuit that suppresses occurrence of an arc in the switch S1 when a current is shut off by the switch S1 in a state where power is fed from the side of the node N1.

The current-limiting circuit AF2$f$ has a configuration in which the current-limiting circuit AF1$e$ is inverted. In other words, the current-limiting circuit AF2$f$ has MOSFETs M3 and M4, Zener diodes D2 and D4, a diode D6, resistors R8, R9, R10, R11, and R12, and a capacitor C2. The current-limiting circuit AF2$e$ is a circuit that suppresses occurrence of an arc in the switch S1 when a current is shut off by the switch S1 in a state where power is fed from the side of the node N3.

If the switch S1 is turned off when a current flows from the node N1 side to the node N3 side, the current-limiting circuit AF1$f$ has a function to gradually lower the current flowing from the node N1 side to the node N3 side. Therefore, the current-limiting circuit AF1$f$ is provided with the diode D5 that passes the current from the node N1 side to the node N3 side. Further, the current-limiting circuit AF2$f$ is provided with the diode D6 and thereby shuts off the current flowing from the node N1 side to the node N3 side.

In contrast, if the switch S1 is turned off when a current flows from the node N3 side to the node N1 side, the current-limiting circuit AF2$f$ has a function to gradually lower the current flowing from the node N3 side to the node N1 side. Therefore, the current-limiting circuit AF2$f$ is provided with the diode D6 that passes the current from the node N3 side to the node N1 side. Further, the current-limiting circuit AF1$f$ is provided with the diode D5 and thereby shuts off the current flowing from the node N3 to the node N1.

The arc suppression device illustrated in FIG. 9 allows for suppression of an arc at the time of power shutoff while preventing an increase in the circuit scale also in a case where power is fed in both directions instead of a single direction. As with the arc suppression device illustrated in FIG. 7, the arc suppression device illustrated in FIG. 9 is provided with the fuse F1 and the protector PF1; however, the arc suppression device illustrated in FIG. 9 may not be provided with the fuse F1 or the protector PF1.

1.7. Seventh Configuration Example

FIG. 10 is an explanatory diagram illustrating a configuration example of the arc suppression device according to the embodiment of the present disclosure. FIG. 10 illustrates a configuration example of the arc suppression device intended to suppress occurrence of an arc at the time of power shutoff. The arc suppression device illustrated in FIG. 10 is configured to include switches S1$a$ and S1$b$ each of which includes, for example, the SSR, and a current-limiting circuit AF1$g$. FIG. 10 illustrates a configuration example of the arc suppression device in shutting off power to be fed from the power supply V1 or a power supply V3. The power supply V1 is a power supply that feeds direct-current power, and the power supply V3 is a power supply that provides alternating-current power.

The switch S1$a$ is configured to be switched on/off by power from the direct-current power supply V2. In a case where the switch S1$a$ is turned on, power from the power supply V1 or the power supply V3 that feeds power is fed to a resistor R4. In a case where the switch S1$a$ is turned off, feeding of the power from the power supply V1 or the power supply V3 to the resistor R4 is shut off.

The switch S1$b$ is a switch that operates in conjunction with the switch S1$a$. The switch S1$b$ is turned off when the switch S1$a$ is turned on, and is turned on when the switch S1$a$ is turned off. FIG. 10 illustrates the switches S1$a$ and S1$b$ that are separated from each other; however, these are equivalent to transfer-type contacts having make-break contacts using the node N2 as a common node.

The current-limiting circuit AF1$g$ has MOSFETs M1 and M2, Zener diodes D1 and D3, resistors R1, R3, R4, and R5, and a capacitor C1. The current-limiting circuit AF1$f$ is a circuit that suppresses occurrence of an arc in the switch S1$a$ when a current is shut off by the switch S1 in a state where power is fed from the side of the node N1.

When the switch S1$a$ is turned off, the resistors R4 and R5 divide a voltage that is generated between the nodes N1 and N2. The MOSFET M2 is turned on when a gate-source voltage becomes a predetermined value. A turn-on state of the MOSFET M2 means that short-circuiting is caused between the gate and the source of the MOSFET M1. When the MOSFET M2 is turned on, and short-circuiting is caused between the gate and the source of the MOSFET M1, the MOSFET M1 is turned off to terminate the voltage integration by the current-limiting circuit AF1$b$.

Here, in a case where the switch S1$b$ is turned off, short-circuiting is not caused between the gate and the source of the MOSFET M1. However, when the switch S1$b$ is turned on, a short-circuiting state is caused between the gate and the source of the MOSFET M1. When the short-circuiting state is caused between the gate and the source of the MOSFET M1, the MOSFET M1 is turned off to terminate the voltage integration by the current-limiting circuit AF1$g$, as described in the second configuration example.

If the switch S1$b$ is turned on, and a short-circuiting state is caused between the gate and the source of the MOSFET M1 before the MOSFET M2 is turned on by voltage dividing with use of the resistors R4 and R5, the current-limiting circuit AF1$g$ is configured to give higher priority to short-circuiting between the gate and the source of the MOSFET M1 that is caused by the switch S1$b$.

2. APPLICATION EXAMPLES

FIG. 11 is an explanatory diagram illustrating a functional configuration example of a mobile body 40 that includes an arc suppression device. For example, the mobile body 40 may be a mobile body that uses gasoline as a power source, such as a gasoline vehicle, or may be a mobile body that uses a chargeable-dischargeable battery as a main power source, such as an electric vehicle, a hybrid electric vehicle, or an electric motorbike. FIG. 11 illustrates an example where the mobile body 40 includes a battery 210, a driving section 220 that performs drive using power fed from the battery, and an arc suppression device 100 that suppresses an arc at the time of shutoff of power from the battery 210. Examples of the driving section 220 may include vehicle equipment such as wipers, powered windows, lights, a car navigation system, or an air conditioner, or a device that drives the mobile body 40 such as a motor.

Further, the mobile body 40 illustrated in FIG. 11 is provided with the arc suppression device 100 in the middle of a path through which direct-current power is fed from the battery 210 to the driving section 220. As the arc suppression device 100, for example, any of the arc suppression devices illustrated in FIG. 1, FIG. 3, FIG. 5, and FIGS. 7 to 10 described above is applicable. The mobile body 40 illustrated in FIG. 11 includes the arc suppression device 100 in the middle of the path through which the direct-current power is fed from the battery 210 to the driving section 220, which makes it possible to shut off the direct-current power safely.

It is to be noted that FIG. 11 illustrates an example of the mobile body 40 that includes only the single arc suppression device 100; however, the present disclosure is not limited to such an example. In other words, the plurality of arc suppression devices 100 may be provided in the middle of the path through which the direct-current power is fed. Further, the arc suppression device 100 may be provided not only in the middle of the path through which the direct-current power is fed from the battery 210 to the driving section 220, but also at any other location, for example, in the middle of a path in the course of charging the battery 210 using the direct-current power. The mobile body 40 includes the arc suppression device 100 in the middle of the path in the course of charging the battery 210 using the direct-current power, which makes it possible to safely charge the battery 210 using the direct-current power.

3. Conclusion

As described above, according to the embodiment of the present disclosure, there are provided the arc suppression device that allows for reduction in the power consumption at the time of power shutoff by reducing size of mechanical contacts to be used for the power shutoff, the mobile body provided with the arc suppression device, and the power supply system provided with the arc suppression device.

Thus far, the preferred embodiment of the present disclosure has been described in detail with reference to the attached drawings; however, a technical scope of the present disclosure is not limited to such examples. It is obvious that any person having ordinary knowledge in the technical field of the present disclosure is able to arrive at a variety of alteration examples or modification examples in the category of technical idea described in the claims, and it is comprehended that these also naturally fall within the technical scope of the present disclosure.

Further, the effects described in the present specification are merely explanatory or exemplified and non-limiting. In other words, the technology according to the present disclosure is able to provide other obvious effects to those skilled in the art from descriptions of the present specification along with the above-described effects or in lieu of the above-described effects.

It is to be noted that configurations described below also fall within the technical scope of the present disclosure.

(1)

An arc suppression device including one or more current-limiting circuits provided in parallel with a circuit breaker that switches between feeding and shutoff of power from a power supply, in which the current-limiting circuit shuts off a current from the power supply when the power from the power supply is fed to a load through a circuit breaker, and the current from the power supply is shut off when a voltage generated by a potential difference between contacts of the circuit breaker becomes a predetermined voltage or higher in a case where feeding of the power from the power supply to the load is shut off by the circuit breaker, the potential difference being generated upon shutoff.

(2)

The arc suppression device according to (1) described above, in which the current-limiting circuit includes a first switching element that is turned off when the power from the power supply is fed to the load through the circuit breaker, and is turned on by the potential difference between the contacts of the circuit breaker that is generated upon the shutoff when feeding of the power from the power supply to the load is shut off by the circuit breaker, and is thereafter turned off after a current generated by the difference passes, and a second switching element that is turned on in accordance with the potential difference to cause short-circuiting between a gate terminal of the first switching element and a source terminal of the first switching element.

(3)

The arc suppression device according to (2) described above, in which the current-limiting circuit includes a capacitor element that raises a gate voltage of the first switching element when feeding of the power from the power supply to the load is shut off.

(4)

The arc suppression device according to (3) described above, in which the current-limiting circuit includes a resistor element that sets, together with the capacitor element, a time when a voltage is applied to the gate terminal of the first switching element.

(5)

The arc suppression device according to (3) described above, in which the current-limiting circuit includes a Zener diode between the source terminal of the first switching element and the gate terminal of the first switching element.

(6)

The arc suppression device according to any one of (2) to (5) described above, in which the current-limiting circuit further includes a switch that is turned on when feeding of the power from the power supply to the load is shut off, and thereby causes short-circuiting between the gate terminal of the first switching element and the source terminal of the first switching element.

(7)

The arc suppression device according to any one of (1) to (6) described above, in which the power to be fed from the power supply includes direct-current power.

(8)

An arc suppression device including one or more current-limiting circuits provided in parallel with a circuit breaker that switches between feeding and shutoff of power from a power supply, in which the current-limiting circuit includes a first switching element that is turned off when the power from the power supply is fed to the load through a circuit breaker, and is turned on by a potential difference between contacts of the circuit breaker when feeding of alternate-current power from the power supply to the load is shut off by the circuit breaker, and is thereafter turned off after a current generated by the potential difference passes, the potential difference being generated upon shutoff, a capacitor element that raises a gate voltage of the first switching element when feeding of the power from the power supply to the load is shut off, and a second switching element that is turned on in accordance with the potential difference to cause short-circuiting between a gate terminal of the first switching element and a source terminal of the first switching element.

(9)

The arc suppression device according to (8) described above, in which the current-limiting circuit includes a resistor element that sets, together with the capacitor element, a time when a voltage is applied to the gate terminal of the first switching element.

(10)

The arc suppression device according to (8) or (9) described above, in which the current-limiting circuit includes a Zener diode between the source terminal of the first switching element and the gate terminal of the first switching element.

(11)

The arc suppression device according to any one of (8) to (10) described above, in which the current-limiting circuit further includes a switch that is turned on when feeding of the power from the power supply to the load is shut off, and thereby causes short-circuiting between the gate terminal of the first switching element and the source terminal of the first switching element.

(12)

The arc suppression device according to (8) to (11) described above, in which the power to be fed from the power supply includes direct-current power.

(13)

A mobile body including one or more the arc suppression devices according to any one of (1) to (12) described above.

(14)

A power supply system including:
a battery that feeds direct-current power;
a driving section that performs drive using the direct-current power fed from the battery; and
one or more the arc suppression devices according to any one of (1) to (12) described above that are provided between the battery and the driving section.

REFERENCE NUMERAL LIST

40: mobile body
100: arc suppression device
210: battery
220: driving section
AF1a, AF1b, AF1c, AF1d, AF1e, AF1f, AF1g, AF2e, AF2f: current-limiting circuit
F1: fuse
PF1: protector
S1, S1a, S1b: switch
V1: power supply
V2: direct-current power supply

The invention claimed is:
1. An arc suppression device, comprising:
a first switch configured to switch between feed of power from a power supply and shutoff of the power from the power supply; and
at least one current-limiting circuit in parallel with the first switch,
wherein the at least one current-limiting circuit includes:
a first Metal-Oxide Semiconductor Field-Effect Transistor (MOSFET) configured to be:
turned off in a case where the power from the power supply is fed to a load through the first switch,
turned on based on:
a potential difference between contacts of the first switch, and
the shutoff, by the first switch, of the power from the power supply to the load, and
turned off based on the turn on of the first MOSFET and a current that passes through the first MOSFET, wherein
the current is based on the potential difference between the contacts of the first switch, and
the potential difference between the contacts of the first switch is based on the shutoff of the power from the power supply to the load;
a capacitor element configured to raise a gate voltage of the first MOSFET based on the shutoff of the power from the power supply to the load; and
a second MOSFET configured to be turned on based on the potential difference between the contacts of the first switch, to cause a short-circuit between a gate terminal of the first MOSFET and a source terminal of the first MOSFET.

2. The arc suppression device according to claim 1, wherein the at least one current-limiting circuit further includes a resistor element configured to set, together with the capacitor element, a time in a case where a voltage is applied to the gate terminal of the first MOSFET.

3. The arc suppression device according to claim 1, wherein the at least one current-limiting circuit further includes a Zener diode between the source terminal of the first MOSFET and the gate terminal of the first MOSFET.

4. The arc suppression device according to claim 1, wherein
the at least one current-limiting circuit further includes a second switch configured to be turned on based on the shutoff of the power from the power supply to the load, and
the short-circuit between the gate terminal of the first MOSFET and the source terminal of the first MOSFET is based on the turn on of the second switch.

5. The arc suppression device according to claim 1, wherein the power fed from the power supply comprises direct-current power.

6. The arc suppression device according to claim 1, further comprising:
a fuse between the power supply and the at least one current-limiting circuit; and
a protector connected to the first switch.

7. A mobile body, comprising:
at least one arc suppression device that includes:
a switch configured to switch between feed of power from a power supply and shutoff of the power from the power supply; and
at least one current-limiting circuit in parallel with the switch,
wherein the at least one current-limiting circuit includes:
a first Metal-Oxide Semiconductor Field-Effect Transistor (MOSFET) configured to be:
turned off in a case where the power from the power supply is fed to a load through the switch,
turned on based on:
a potential difference between contacts of the switch, and
the shutoff, by the switch, of the power from the power supply to the load, and
turned off based on the turn on of the first MOSFET and a current that passes through the first MOSFET, wherein
the current is based on the potential difference between the contacts of the switch, and the potential difference between the contacts of the switch is based on the shutoff of the power from the power supply to the load;
a capacitor element configured to raise a gate voltage of the first MOSFET based on the shutoff of the power from the power supply to the load; and
a second MOSFET configured to be turned on based on the potential difference between the contacts of the switch, to cause a short-circuit between a gate terminal of the first MOSFET and a source terminal of the first MOSFET.

8. A power supply system, comprising:
a battery configured to feed direct-current power;
a driving section configured to execute a drive operation based on the direct-current power fed from the battery; and
at least one arc suppression device between the battery and the driving section, wherein the at least one arc suppression device comprises:
a switch configured to switch between the feed of the direct-current power from the battery to the driving section and shutoff of the direct-current power from the battery to the driving section; and
at least one current-limiting circuit in parallel with the switch,
wherein the at least one current-limiting circuit includes:
a first Metal-Oxide Semiconductor Field-Effect Transistor (MOSFET) configured to be:
turned off in a case where the direct-current power from the battery is fed to the driving section through the switch,
turned on based on:
a potential difference between contacts of the switch, and
the shutoff, by the switch, of the direct-current power from the battery to the driving section, and turned off based on the turn on of the first MOSFET and a current that passes through the first MOSFET, wherein
the current is based on the potential difference between the contacts of the switch, and
the potential difference between the contacts of the switch is based on the shutoff of the direct-current power from the battery to the driving section;
a capacitor element configured to raise a gate voltage of the first MOSFET based on the shutoff of the direct-current power from the battery to the driving section; and
a second MOSFET configured to be turned on based on the potential difference between the contacts of the switch, to cause a short-circuit between a gate terminal of the first MOSFET and a source terminal of the first MOSFET.

* * * * *